May 8, 1951 A. J. ROOT 2,552,382
ROTARY BRUSH FOR LAWN SWEEPERS
Filed Oct. 14, 1948 2 Sheets-Sheet 1
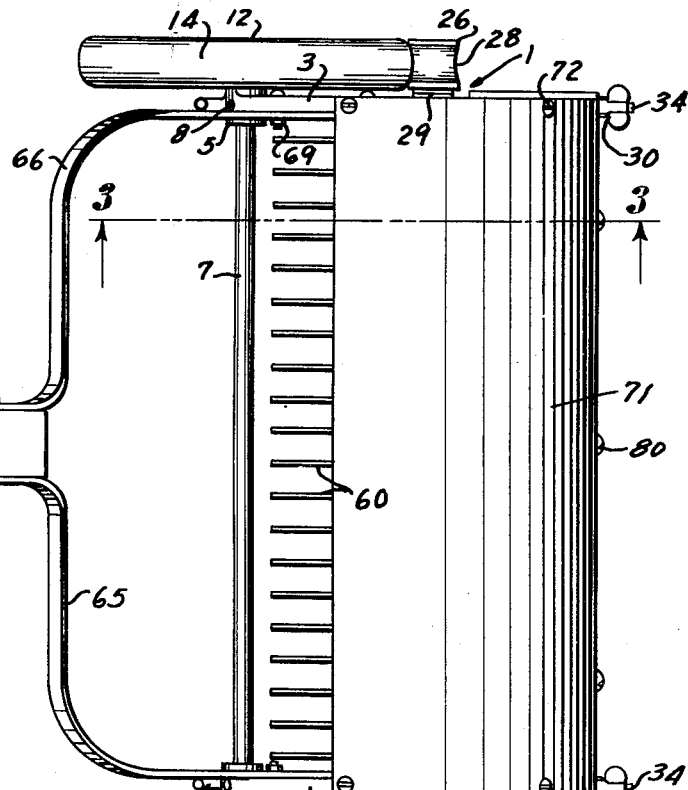
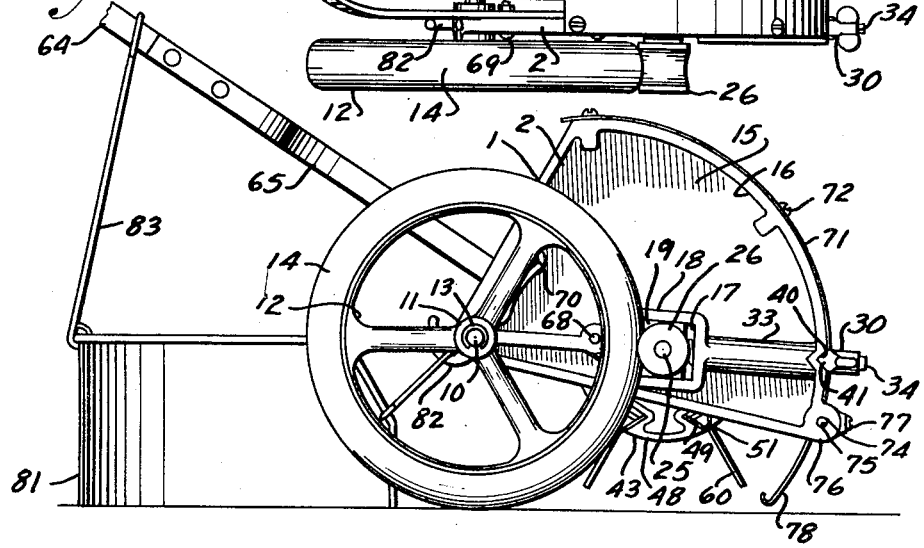
Inventor
ARTHUR JOHN ROOT
By Fishburn + Mullendore
Attorneys May 8, 1951 A. J. ROOT 2,552,382
ROTARY BRUSH FOR LAWN SWEEPERS
Filed Oct. 14, 1948 2 Sheets-Sheet 2

Inventor
ARTHUR JOHN ROOT
By Fishburn & Mullendore
Attorneys

Patented May 8, 1951

2,552,382

UNITED STATES PATENT OFFICE 2,552,382

ROTARY BRUSH FOR LAWN SWEEPERS

Arthur John Root, Baxter Springs, Kans.

Application October 14, 1948, Serial No. 54,525

3 Claims. (Cl. 15—183)

This invention relates to lawn sweepers and more particularly to such a device for sweeping leaves, cut grass and the like from lawns and catching the sweepings in a basket or hopper for removal to a suitable place of disposal.

The objects of the invention are to provide a lawn sweeper having a rotatable brush and brush hood for removing leaves and the like from lawns and directing the sweepings into a basket carried by said sweeper; to provide a sweeper with a rotatable brush reel having resilient, flexible bristles and mounting therefor adapted for easy removal and replacement; to provide a sweeper supported on wheels with a selective drive to the brush member; to provide a friction drive from ground engaging wheels to the brush reel, said drive being selectively disengageable for movement of the sweeper and basket thereon, as when transporting sweepings, without operation of said brush; to provide a lawn sweeper carried by wheels and having an adjustable handle so positioned to control the engagement of a brush thereon with the surface being swept as the sweeper is pushed by said handle; to provide an adjustable hood extension for supporting the forward end of the sweeper when not in use; and to provide a simple, efficient, lawn sweeping machine which is economical to manufacture and easy to maintain.

In accomplishing these and other objects of the present invention, I have provided improved details of structure, the preferred forms of which are illustrated in the accompanying drawings, wherein:

Fig. 1 is a plan view of a lawn sweeper embodying the features of the present invention.

Fig. 2 is a side elevation of the lawn sweeper.

Figure 3:
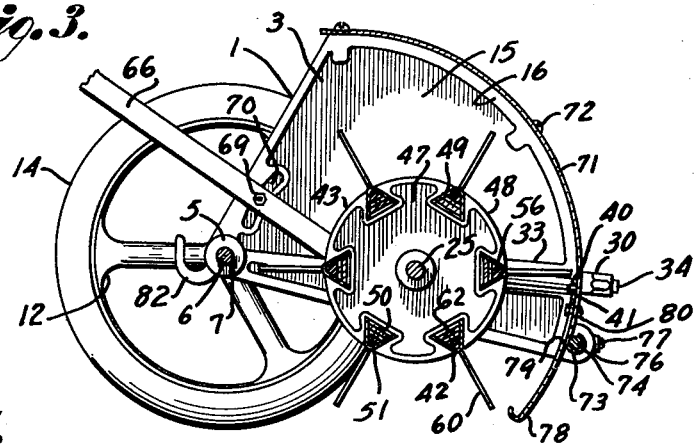
Fig. 3 is a sectional view through the sweeper on the line 3—3, Fig. 1.

Referring more in detail to the drawings:

1 designates a lawn sweeper embodying the features of my invention comprising spaced frames 2 and 3 having bosses 4 and 5 respectively adjacent the rear end of said frame members. The bosses 4 and 5 have coaxial or aligned bores 6 through which extend a shaft 7 to which the frames are fixed by suitable fastening devices such as setscrews 8 threadedly mounted in threaded bores 9 in the bosses 4 and 5. The ends of the shaft 7 project beyond the bosses 4 and 5 to provide trunnions 10 for rotatably mounting the hubs 11 of ground engaging wheels 12, said wheels being retained on the trunnions by means of suitable wheel locks or retainers 13 mounted on the end of the shaft 7 in engagement with the outer end of the hub 11 holding same substantially in engagement with the bosses 4 and 5 for limited lateral movement of the wheels 12. The wheels 12 are preferably provided with a resilient peripheral member such as a rubber tire 14. While the tire is shown as being solid rubber, it could be a pneumatic tire or other suitable structure to provide the resiliency therein.

The spaced frame members 2 and 3 extend forwardly relative to the shaft 7 and consist of web members 15 provided with suitable flanges or ribs 16. Arranged in said frames forwardly of the shaft 7 and adjacent the periphery of the tires 14 are rectangular openings 17 surrounded by flanges 18 providing suitable bearing area to slideably mount bearing blocks 19 in said openings, said bearing blocks having flanges 20 adapted to engage the inner edge of the flanges 18. The bearing blocks are each provided with a bore 22 extending therethrough and a counterbore 23 on the inner side of the blocks to suitably mount antifriction bearings 24 for rotatably supporting a shaft 25 in said bearing blocks. The shaft 25 is preferably substantially the same length as the shaft 7 whereby a portion of said shaft 25 extends into alignment with the wheels 12, the outer ends of the shaft 25 having reel drums 26 suitably fixed on the shaft 25 as by pins 27. The periphery 28 of said drums is preferably concave to correspond to the curvature of the periphery of the wheel tire 14. Suitable washers 29 are interposed between the drums and the bearing blocks 19 to limit the lateral movement of the shaft 25.

The openings 17 carrying the bearing blocks 19 are so arranged that the bearing blocks may be moved toward or away from the shaft 7 to selectively engage or disengage the peripheries 28 of the drums 26 with the peripheries of the tires 14 to provide a selective frictional drive for the shaft 25. Control of the movement of the bearing blocks is by thumb nuts 30 loosely mounted on studs 31 which extend through bores 32 of elongated, cylindrical bosses 33 arranged substantially horizontally relative to the axes of the shafts 7 and 25. The thumb nuts 30 are retained on the studs by means of heads 34 on the outer ends thereof and the inner ends of said studs are threaded as at 35 and screwed into threaded openings 36 in the outer ends of the bearing blocks 19. Pressure is applied to the bearing blocks 19 tending to urge same toward the peripheries of the tires 14 by means of springs 37 sleeved over the studs 31 and having one end engaging the outer end of the bearing blocks 19 and the other end engaged by spring adjusting nuts 38 also sleeved over the studs 31 and having screw-threaded peripheries engaging screw threads 39 in the bores 32 of the bosses 33. The outer ends of the bosses 33 are preferably provided with transverse grooves 40 adapted to receive correspondingly shaped projecting cam portions 51 on the thumb nuts 30, whereby when the projecting portions are resting in the grooves 40 the length of the stud will be such that pressure of the spring 37 will hold the peripheries 28 of the drums 26 in engagement with the tires 14. Turning of the thumb nuts through an angle of 90° will move the projecting portions 41 out of the grooves 40 and by engagement of the thumb nuts with the heads 34 draw the studs 31 and the bearing blocks 19 connected thereto outwardly against the pressure of the springs 37 to disengage the drums and tires 14. This arrangement provides a quick and accurate control of the engagement of the drums and wheels and controls the drive of the shaft 25 and the reel type brush 42 carried thereon.

The reel brush preferably consists of spaced brush holders 43 having hubs 44 fixed as by setscrews 45 to the shaft 25, said hubs preferably being arranged whereby the outer ends thereof engage the bearing blocks 19. The brush holders include webs 47 extending outwardly from the hubs, said webs having flanged peripheries 48 provided with a plurality of brush-receiving recesses 49 spaced around the peripheries thereof. The recesses 49 preferably are triangular in shape, the bases 50 of which are adjacent the hub 44 of said brush holders, said recesses being of such size to suitably retain brushes 51 therein.

Figure 4:
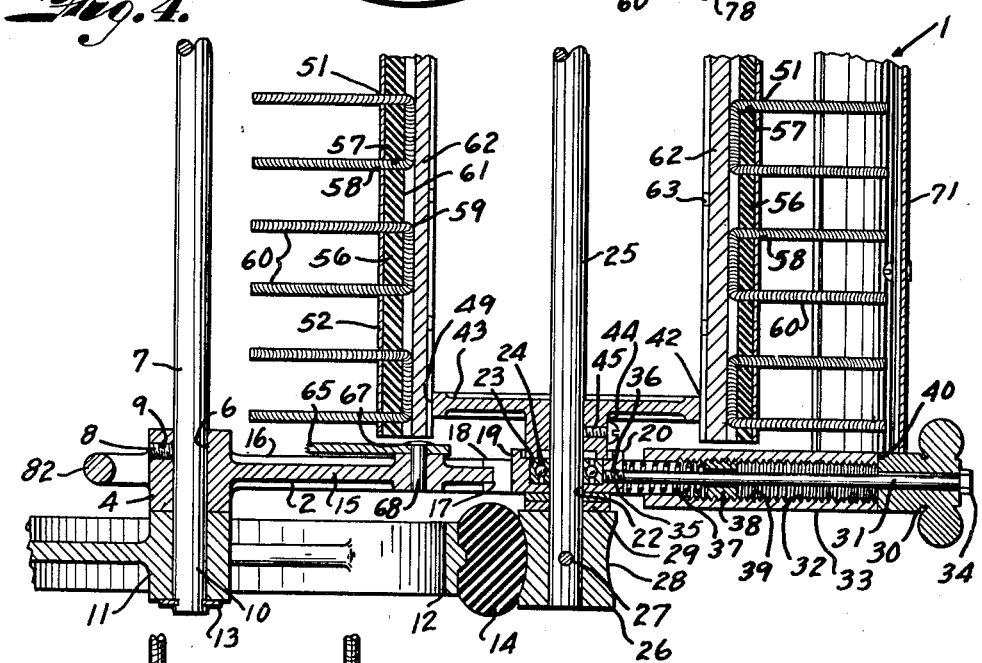
Fig. 4 is a partial horizontal sectional view, illustrating the brush reel mounting and drive therefor.
Figure 5:
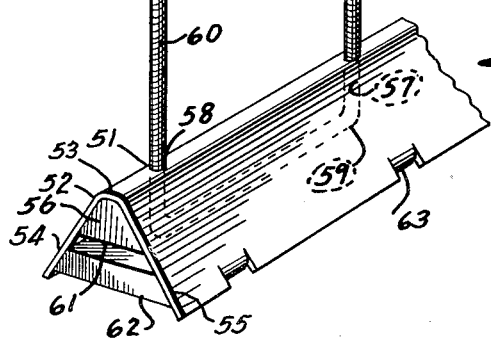
Fig. 5 is a detail perspective view of one end of a bristle holder.

Each of the brushes preferably consists of a brush back 52 formed of a strip of sheet metal bent as at 53 to provide diverging legs 54 and 55 having some resiliency, and of such size that the ends may be compressed slightly and inserted into a recess 49 whereby the spring back of the legs 54 and 55 will provide frictional engagement with the sides of the triangular recess 49 to retain the brush back therein. Arranged between the legs 54 and 55 adjacent the bend portion 53 thereof is a resilient strip 56 of suitable material such as rubber. This strip 56 and the brush back 52 are provided with a plurality of spaced, aligning apertures 57 and 58 adapted to receive bristles 59 therein. The brush bristles 59 preferably are formed of flexible, resilient members such as extension springs and the like. Said bristles preferably are formed of material commonly used for speedometer cables in automobiles and while said bristles may be suitably secured to the brush back in any well nnown manner, it is preferable that said cables be bent in a U-shape, as illustrated in Fig. 4, and the legs 60 thereof inserted through adjacent apertures 58 and 57 in the strip 56 and brush back 52 whereby the connecting portion or bar of the U engages the surface 61 of the rubber strip 56. To retain the bristles in this position a lock strip 62 of wood or other suitable material is arranged between and in engagement with the legs 54 and 55 adjacent the outer edges thereof, said locking strip being of such thickness that it will engage the bar portion of the bristles when the outer surface of said locking strip is engaged by tabs 63 bent from the outer edges of the legs 54 and 55 to retain said locking strip in position.

The bristles 59 are of such length that the ends thereof engage the surface over which the sweeper is being moved when the shaft 25 is substantially in a horizontal plane with the shaft 7, however, since the frames 2 and 3 are fixed to the shaft 7, which in turn is rotatably mounted in the hubs 11 of the wheels 12, the brush may be freely moved toward or away from the surface to be swept. This is accomplished as the sweeper is operated by means of a handle 64 having suitable yoke members 65 and 66 bent whereby the ends 67 thereof are spaced slightly from the inner edges of the frames 2 and 3, the terminal ends of said yokes being pivotally mounted on pins 68 carried by said frame members slightly to the rear of the bearing mounting openings 17. The angularity of the handle relative to the frame is adjustable and may be suitably fixed in adjusted position by means of suitable fastening devices 69 extending through the yoke members 65 and 66 and aligning arcuate slots 70 in the frame members 2 and 3. When the handle member is adjusted to the suitable angularity and the fastening devices 69 tightened, said handle becomes rigid with the frame members and raising and lowering of the handle member will effect raising and lowering of the brush reel relative to the surface to be swept.

When forward pressure is applied on the handle 64, the sweeper is moved forwardly on the wheels 12 and when driving engagement is provided between the drums 26 and the tires 14, rotation of said wheels will effect rotation of the brush reel in the opposite direction tending to move leaves and the like ahead of said sweeper. It is desirable to remove said leaves from the lawns, therefore the forward and upward portion of the frames 2 and 3 are arcuate in contour and mounted thereon is a hood 71, said hood being a sheet of curved metal of such length as to extend over the frame members, the outer edges of the hood being secured to the frame members by suitable fastening devices 72. The lower end of said hood is rolled as at 73 around a rod 74, the ends of which are carried in bores 75 of bosses 76 located at the forward and lower ends of the frames 2 and 3, the rod 74 being secured in said bosses by means of suitable setscrews 77. Adjustably secured to the lower end of the hood is the hood extension 78 so shaped as to provide an extension to the contour of the hood. The extension is slotted at the upper end as at 79 to receive fastening devices 80 in the hood, said slots being arranged vertically whereby the extension below the rolled end 73 may be adjusted as desired and the fastening devices 80 tightened to secure the extension in place. Forward movement of the sweeper and rotation of the brush then causes the bristles 60 to move leaves and other material forwardly and upwardly under the hood to direct said swept material into a basket 81 suitably supported at its sides on hooks 82 carried on the hubs 4 and 5 of the frames 2 and 3, the rear center portion of said basket being supported by a hook or the like 83 having engagement with the handle 64 as shown in Fig. 2.

In using a lawn sweeper constructed as described the fastening devices 80 are loosened to permit adjustment of the extension 78 whereby when the forward end of the sweeper is resting on the lower end of said hood extension the ends of the bristles 60 engage said surface to be swept. After such adjustment the fastening devices 80 are tightened to securely retain the hood extension in position. The fastening devices 69 are then loosened, the handle moved on the pin 68 and the fastening device 69 in the slot 70 to adjust the angularity of the handle and height thereof to accommodate the person using same. The fastening device 69 is then tightened to secure the handle in adjusted position. A suitable grass catcher or basket is then applied to the handle and the hooks 82 and then the sweeper is ready to move to the place of use. In order to assure free movement of the reel, the disengaging thumb nuts are rotated to position the ribs 41 thereon transversely of the groove 40 whereby the bearing blocks 19 are moved toward the forward end of the sweeper to retract the reel drums 26 from engagement with the tires 14. After the sweeper has been moved to a point of use, the thumb nuts are turned to position the ribs 41 in the grooves 40 whereby the springs 37 move the bearing blocks 19 in the openings 17 to effect frictional engagement between the reel drums 26 and the tires 14. Pushing on the handle 64 with slight downward pressure lifts the hood extension from the surface and as the sweeper is moved the rotation of the wheels 12 drives the reel drums 26, shaft 25 and brush reel 42, rotating same whereby the bristles 60 move over the grass or the like on the lawn to sweep leaves and cut grass forwardly of the brush and upwardly inside of the hood to throw said leaves over the brush and into the basket 81. Engagement of the bristles with the grass or the like bends said bristles and as they move away from the grass the resiliency of the springs forming the bristles tends to straighten same quickly, providing additional force tending to kick the leaves and the like into said basket. After the basket is filled the thumb nuts are turned to retract the reel drums from the tires to permit free running of the wheels 12 to permit moving the full basket and sweeper, without rotation of the brush reel, to a place of disposal of said leaves.

It is believed obvious that I have provided a simple, efficient lawn sweeper having long life and ease of operation in sweeping lawns and the like.

What I claim and desire to secure by Letters Patent is:

1. A rotary brush for lawn sweepers comprising, a reel including spaced discs having a plurality of recesses around the peripheries, each of the recesses in one disc being aligned with a recess in the other disc and having sides diverging from the peripheries, brush backs having diverging legs resiliently engaging the diverging sides of the recesses for retaining said backs therein, said brush backs having a plurality of spaced apertures therein between the legs, U-shaped bristles of flexible, resilient material having legs extending through adjacent apertures and a bar portion therebetween, a retainer member between the legs of the brush backs and engaging the bar portions of the bristles for holding same in place, and means on the brush backs for securing the retaining members therein.

2. A rotary brush for lawn sweepers comprising, a reel including spaced discs having a plurality of recesses around the peripheries, each of the recesses in one disc being aligned with a recess in the other disc and having sides diverging from the peripheries, brush backs having ends seating in aligned recesses and having diverging legs resiliently engaging the diverging sides of said recesses for retaining said backs therein, said brush backs having a plurality of spaced apertures therein between the legs, resilient strips between the legs of the brush backs, said resilient strips having apertures aligning with the apertures in the brush backs, U-shaped bristles of flexible, resilient spirals of wire having legs extending through adjacent apertures in the resilient strips and brush backs and a bar portion engaging the resilient strips, a retainer member between the legs of the brush backs and engaging the bar portions of the bristles for holding same in place, and means on the brush backs for securing the retaining members therein.

3. A rotary brush for lawn sweepers comprising, a shaft having bearing portions adjacent the ends thereof, spaced discs fixed on the shaft between the bearing portions, said discs having a plurality of recesses spaced around the peripheries thereof, each of the recesses in one disc being aligned with a recess in the other disc and having sides diverging from the peripheries, brush backs formed of resilient strips of material bent to form diverging legs which resiliently engage the diverging sides of aligned recesses for retaining the brush backs therein, said brush backs having a plurality of spaced apertures at the bends thereof, resilient strips between the legs adjacent the bends of the brush backs, said resilient strips having apertures aligning with the apertures in the brush backs, U-shaped bristles of flexible, resilient spirals of wire having legs extending through adjacent apertures in the resilient strips and brush backs and a bar portion engaging the resilient strips, a retainer member between the legs of the brush backs and engaging the bar portions of the bristles, and inwardly turned lugs engaging the retaining members for securing same in the brush backs.

ARTHUR JOHN ROOT.

REFERENCES CITED

The following references are of record in the file of this patent:

UNITED STATES PATENTS

| Number | Name | Date |
|---|---|---|
| 431,146 | Tellier | July 1, 1890 |
| 513,438 | Palmer | Jan. 23, 1894 |
| 604,812 | Walton | May 31, 1898 |
| 1,168,849 | Butler | Jan. 18, 1916 |
| 1,439,832 | Merrill | Dec. 26, 1922 |
| 1,580,600 | Holbrook | Apr. 13, 1926 |
| 2,092,230 | Thomas | Sept. 7, 1937 |
| 2,324,461 | Anderson | July 13, 1943 |

FOREIGN PATENTS

| Number | Country | Date |
|---|---|---|
| 572,798 | Germany | Mar. 22, 1933 |